US011391283B2

(12) United States Patent
Kabasawa (10) Patent No.: US 11,391,283 B2
(45) Date of Patent: Jul. 19, 2022

(54) VACUUM PUMP EXHAUST SYSTEM, VACUUM PUMP PROVIDED FOR VACUUM PUMP EXHAUST SYSTEM, PURGE GAS SUPPLY UNIT, TEMPERATURE SENSOR UNIT, AND EXHAUSTING METHOD OF VACUUM PUMP

(71) Applicant: Edwards Japan Limited, Chiba (JP)

(72) Inventor: Takashi Kabasawa, Chiba (JP)

(73) Assignee: Edwards Japan Limited, Chiba (JP)

( * ) Notice: Subject to any disclaimer, the term of this patent is extended or adjusted under 35 U.S.C. 154(b) by 344 days.

(21) Appl. No.: 16/491,909

(22) PCT Filed: Mar. 2, 2018

(86) PCT No.: PCT/JP2018/008138
§ 371 (c)(1),
(2) Date: Sep. 6, 2019

(87) PCT Pub. No.: WO2018/164013
PCT Pub. Date: Sep. 13, 2018

(65) Prior Publication Data
US 2021/0018003 A1    Jan. 21, 2021

(30) Foreign Application Priority Data

Mar. 10, 2017 (JP) .............................. JP2017-046181

(51) Int. Cl.
*F04D 19/04* (2006.01)
*F04D 25/06* (2006.01)
(Continued)

(52) U.S. Cl.
CPC ........... *F04D 19/04* (2013.01); *F04D 19/042* (2013.01); *F04D 25/0666* (2013.01);
(Continued)

(58) Field of Classification Search
CPC ...... F04D 29/701; F04D 19/04; F04D 19/042; F04D 25/0666; F04D 27/00; F04D 27/03; F04D 27/006; F16C 2360/45; G01K 13/00
See application file for complete search history.

(56) References Cited

U.S. PATENT DOCUMENTS

2003/0185272 A1*  10/2003  Miwata ..................... G01J 5/06
                                                                  374/120
2009/0101214 A1*   4/2009  North ..................... F04D 19/046
                                                                  137/15.04
(Continued)

FOREIGN PATENT DOCUMENTS

GB    201502993    *   4/2015
JP    S62168992 A      7/1987
(Continued)

OTHER PUBLICATIONS

Communication dated Nov. 13, 2020 and European Search Report dated Nov. 2020 for corresponding European Application Serial No. 18764783.9, 10 pages.
(Continued)

*Primary Examiner* — Charles G Freay
(74) *Attorney, Agent, or Firm* — Theodore M. Magee; Westman, Champlin & Koehler, P.A.

(57) ABSTRACT

A vacuum pump exhaust system and an exhausting method of the vacuum pump supply a purge gas to the vacuum pump such that an amount of the purge gas satisfies one of following conditions: an amount of the purge gas flowing at a higher velocity than a backflow velocity of gas exhausted by the vacuum pump on at least a part of a downstream side of the temperature sensor unit, and an amount of the purge gas having a pressure of one of an intermediate flow and a viscous flow around the temperature sensor unit. The exhaust system further includes a purge gas supply unit
(Continued)

capable of controlling a flow rate of purge gas introduced into the vacuum pump. This configuration can prevent process gas from flowing backward so as to change the composition around the temperature sensor unit, thereby accurately measuring the temperature of the rotating portion.

8 Claims, 7 Drawing Sheets (51) Int. Cl.
    *F04D 27/00*       (2006.01)
    *F04D 29/00*       (2006.01)
    *F04D 29/70*       (2006.01)
    *G01K 13/00*       (2021.01)

(52) U.S. Cl.
    CPC ......... *F04D 27/001* (2013.01); *F04D 29/701* (2013.01); *F05D 2270/303* (2013.01); *F16C 2360/45* (2013.01); *G01K 13/00* (2013.01)

(56) References Cited

U.S. PATENT DOCUMENTS

| 2011/0200460 | A1* | 8/2011 | Nonaka | F04D 27/001 417/63 |
|---|---|---|---|---|
| 2021/0200460 | A1* | 7/2021 | Lu | G06F 3/0679 |

FOREIGN PATENT DOCUMENTS

| JP | H10259793 | A | 9/1998 |
|---|---|---|---|
| JP | H1137087 | A | 2/1999 |
| JP | H11336691 | A | 12/1999 |
| JP | 2000018189 | A | 1/2000 |
| JP | 2003184785 | A | 7/2003 |
| JP | 2003287463 | A | 10/2003 |
| JP | 2008240571 | A | 10/2008 |
| JP | 2014062480 | A | 4/2014 |
| JP | 2002039088 | A1 | 2/2020 |
| WO | 2010021307 | A1 | 1/2012 |
| WO | 2012108087 | A1 | 8/2012 |

OTHER PUBLICATIONS

PCT International Search Report dated Jun. 19, 2018 for corresponding PCT Application No. PCT/JP2018/008138.
PCT International Written Opinion dated Jun. 19, 2018 for corresponding PCT Application No. PCT/JP2018/008138.
Communication dated Mar. 7, 2022 for corresponding European Application Serial No. 18764783.9, 8 pages.

* cited by examiner

1. CALCULATION CONDITIONS

| ITEM | SYMBOL | UNIT | CONDITION 1 | CONDITION 2 | CONDITION 3 |
|---|---|---|---|---|---|
| PRESSURE | P | Pa | 266 | 266 | 266 |
| TEMPERATURE | T | °C | 27 | 27 | 27 |
| CHANNEL OUTSIDE DIAMETER | Do | mm | 200 | 200 | 200 |
| CHANNEL INSIDE DIAMETER | Di | mm | 190 | 198 | 198 |
| CHANNEL LENGTH | L | m | 0.01 | 0.01 | 0.01 |
| N2 GAS SUPPLY AMOUNT | Q | sccm | 60 | 60 | 20 |

2. INTERMEDIATE CALCULATED VALUE

| TEMPERATURE | T | K | 300 | 300 | 300 |
|---|---|---|---|---|---|
| THERMAL VELOCITY | v | m/s | 398 | 398 | 398 |
| MEAN FREE PATH | $\lambda$ | m | 2.6E-05 | 2.6E-05 | 2.6E-05 |
| Ar DIFFUSION COEFFICIENT | D | $m^2/s$ | 3.5E-03 | 3.5E-03 | 3.5E-03 |
| CHANNEL CROSS-SECTIONAL AREA | S | $m^2$ | 0.00306 | 0.00063 | 0.00063 |
| N2 SUPPLY AMOUNT | Q | $Pa\,m^3/s$ | 0.10 | 0.10 | 0.03 |
| N2 VOLUME FLOW RATE | Qv | $m^3/s$ | 3.8E-04 | 3.8E-04 | 1.3E-04 |

3. CALCULATION RESULTS

| CHANNEL FLOW VELOCITY | Va | m/s | 0.12 | 0.60 | 0.20 |
|---|---|---|---|---|---|
| Ar BACKFLOW VELOCITY | Vb | m/s | 0.35 | 0.35 | 0.35 |
| EVALUATION | | | NG | OK | NG |

VACUUM PUMP EXHAUST SYSTEM, VACUUM PUMP PROVIDED FOR VACUUM PUMP EXHAUST SYSTEM, PURGE GAS SUPPLY UNIT, TEMPERATURE SENSOR UNIT, AND EXHAUSTING METHOD OF VACUUM PUMP

CROSS-REFERENCE OF RELATED APPLICATION

This application is a Section 371 National Stage Application of International Application No. PCT/JP2018/008138, filed Mar. 2, 2018, which is incorporated by reference in its entirety and published as WO 2018/164013 A1 on Sep. 13, 2018 and which claims priority of Japanese Application No. 2017-046181, filed Mar. 10, 2017.

BACKGROUND

The present invention relates to a vacuum pump exhaust system, a vacuum pump provided for the vacuum pump exhaust system, a purge gas supply unit, a temperature sensor unit, and an exhausting method of the vacuum pump, and more specifically relates to a structure for accurately measuring a temperature of a rotating portion of the vacuum pump.

In a vacuum pump exhaust system where gas is exhausted by rotating a rotating portion at high speed, the rotating portion of a vacuum pump may reach a high temperature exceeding 100° C. If the high-speed rotation of the rotating portion at a high temperature is continued, a creep may adversely affect the durability of the rotating portion.

In order to prevent such a creep in advance, it is necessary to measure and monitor the temperature of the rotating portion. The rotating portion rotates at high speed and thus it is necessary to measure the temperature by using a non-contact temperature sensor (temperature sensor unit).

Figure 7:
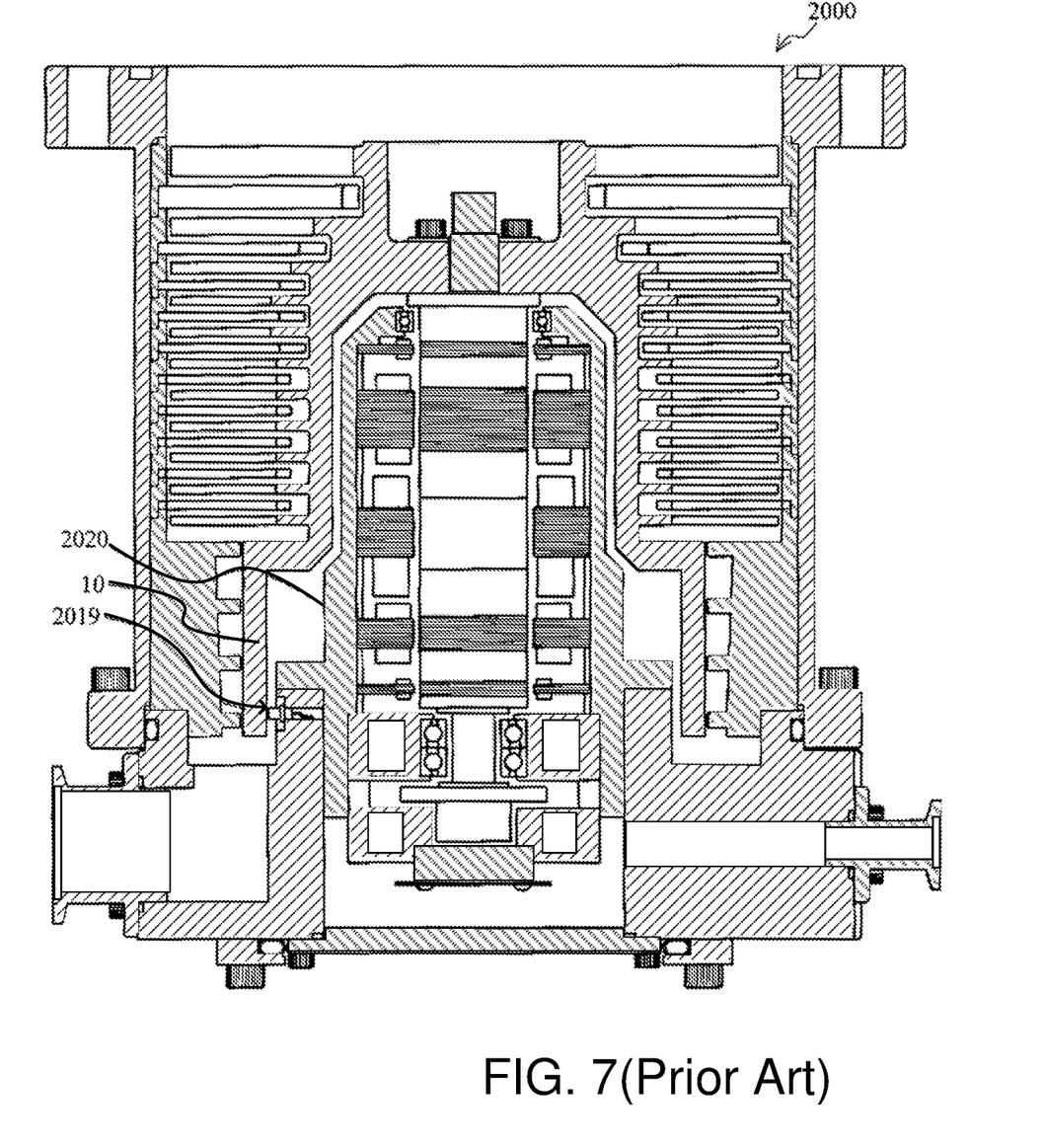
FIG. 7 is an explanatory drawing of a vacuum pump according related art.

FIG. 7 is an explanatory drawing illustrating a conventional vacuum pump exhaust system 2000.

A vacuum pump provided for the conventional vacuum pump exhaust system 2000 has a temperature sensor unit 2019 on the downstream side of the periphery of a stator column 2020. The temperature sensor unit 2019 measures a temperature at the inner surface of a rotating portion 10.

The discussion above is merely provided for general background information and is not intended to be used as an aid in determining the scope of the claimed subject matter. The claimed subject matter is not limited to implementations that solve any or all disadvantages noted in the background.

SUMMARY

WO 2010/021307 describes a plurality of temperature sensors and a method of estimating the temperature of a rotor blade (rotating portion) on the basis of a temperature difference between the temperature sensors. More specifically, in the disclosed method, the temperature sensors are installed at two locations on a purge gas channel formed inside the rotor blade of a vacuum pump (turbo-molecular pump) and the temperature of the rotor blade is estimated according to a temperature difference caused by a heat quantity transmitted through purge gas. In the case of the measuring method, 100% purge gas is desirably supplied in an atmosphere around the temperature sensors in order to accurately measure a temperature.

In this case, the quantity of flowing purge gas is generally about 20 sccm (20 cc per minute) and thus the velocity (flow rate) of purge gas is low. For example, if the rotor blade has an inside diameter of 200 mm, the channel of purge gas is 5 ram in width, and purge gas has a pressure of 2 Torr, a mean velocity of purge gas is quite low, e.g., about 4 cm per second.

Thus, if low-thermal-conductivity process gas for a semiconductor manufacturing device or the like flows backward, the purge gas cannot wash off (press back) the process gas. This may leave the process gas around the temperature sensor.

In this case, a change of the composition of the gas may increase errors of measurement by the temperature sensor.

Instead of exhausting a large amount of gas with a vacuum pump in the manufacturing of semiconductors, the passage of quite a small amount of gas during evaporation may reduce a gas pressure around the temperature sensor.

In this case, if the pressure of purge gas is kept low around the temperature sensor, only an intermediate flow or a molecular flow may be obtained instead of a desirable viscous flow. Thus, a heat quantity may be insufficiently transmitted so as to increase errors of measurement by the temperature sensor.

Japanese Patent Application Publication No. H11-37087 describes a technique of increasing radiation factors of a rotor blade, a target of measurement, and a heat receiving portion, a part of a temperature sensor, by coating or the like in order to obtain a heat transfer amount even if a gas pressure is kept low due to a low gas flow rate.

The rotor blade is heated up to about 150° C. but a sufficient heat quantity cannot be obtained only by radiant heat transmission. This may reduce accuracy of measurement of the temperature sensor.

Japanese Patent No. 3201348 describes a technique in which the lower end of a rotor blade has a small gap located between the rotor blade and a stator portion. Purge gas is supplied into the gap to prevent entry of process gas around a bearing.

This technique is proposed to prevent the entry of process gas around the bearing but does not refer to management of gas components around the temperature sensor or improvement of accuracy of the temperature sensor.

An object of the present invention is to achieve a vacuum pump exhaust system, a vacuum pump provided for the vacuum pump exhaust system, a purge gas supply unit, a temperature sensor unit, and an exhausting method of the vacuum pump, by which a temperature of a rotating portion (rotor blade) can be accurately measured.

In an invention according to a first aspect, a vacuum pump exhaust system, including: a vacuum pump having a temperature sensor unit that measures a temperature of a rotating portion in a purge gas channel; a purge gas storage for storing purge gas used in the vacuum pump; and a purge gas supply unit that supplies the purge gas stored in the purge gas storage to the vacuum pump; wherein at least when the temperature sensor unit measures the temperature of the rotating portion, the purge gas is supplied to the vacuum pump such that an amount of the purge gas satisfies one of following conditions: an amount of the purge gas flowing at a higher velocity than a backflow velocity of gas exhausted by the vacuum pump on at least a part of a downstream side of the temperature sensor unit, and an amount of the purge gas having a pressure of one of an intermediate flow and a viscous flow around the temperature sensor unit.

In an invention according to a second aspect, provided is the vacuum pump exhaust system according to the first aspect, wherein the purge gas supplied to the vacuum pump is allowed to have the pressure of one of an intermediate flow and a viscous flow by setting the amount of purge gas such that a mean free path of the purge gas around the temperature sensor unit is smaller than a distance between the temperature sensor unit and the rotating portion.

In an invention according to a third aspect, provided is the vacuum pump exhaust system according to the first aspect, wherein the vacuum pump includes a stator column for storing an electrical component for rotating the rotating portion, and a base with the stator column fixed thereto, the stator column including a constricted portion on at least a part of the downstream side of the temperature sensor unit in the purge gas channel, the constricted portion having a larger outside diameter than the base, allowing the supply of the purge gas to the vacuum pump at a higher flow velocity than a backflow velocity of gas exhausted by the vacuum pump.

In an invention according to a fourth aspect, provided is the vacuum pump exhaust system according to the first aspect, wherein the vacuum pump includes a stator column for storing an electrical component for rotating the rotating portion, and a base with the stator column fixed thereto, the base including a constricted portion on at least a part of the downstream side of the temperature sensor unit in the purge gas channel, the constricted portion having a larger outside diameter than the stator column, allowing the supply of the purge gas to the vacuum pump at a higher flow velocity than a backflow velocity of gas exhausted by the vacuum pump.

In an invention according to a fifth aspect, provided is the vacuum pump exhaust system according to any one of the first to fourth aspects, wherein the purge gas supply unit is capable of setting at least two flow rates of the purge gas supplied to the vacuum pump, one of the flow rates is set when a temperature is measured by the temperature sensor unit, and the other flow rate is set except when a temperature is measured by the temperature sensor unit.

In an invention according to a sixth aspect, provided is the vacuum pump exhaust system according to any one of the first to fifth aspects, wherein the temperature sensor unit includes: a heat receiving portion opposed to the rotating portion; an insulating portion supporting the heat receiving portion; a mounting portion for mounting the insulating portion into the vacuum pump; and a first temperature sensor fixed to the heat receiving portion.

In an invention according to a seventh aspect, provided is the vacuum pump exhaust system according to the sixth aspects, wherein the heat receiving portion and the insulating portion of the temperature sensor unit are molded integrally.

In an invention according to an eighth aspect, provided is the vacuum pump exhaust system according to any one of the sixth to seventh aspects, wherein the temperature sensor unit includes a second temperature sensor on one of the insulating portion, the mounting portion, and a component for mounting the temperature sensor unit, and the temperature sensor unit measures the temperature of the rotating portion according to a temperature difference between the first temperature sensor and the second temperature sensor.

In an invention according to a ninth aspect, a vacuum pump is provided for the vacuum pump exhaust system according to at least one of the first to eighth aspects.

In an invention according to a tenth aspect, a purge gas supply unit is provided for the vacuum pump exhaust system according to at least one of the first to eighth aspects.

In an invention according to an eleventh aspect, a temperature sensor unit is provided for the vacuum pump exhaust system according to at least one of the first to eighth aspects.

In an invention according to a twelfth aspect, an exhausting method of the vacuum pump in the vacuum pump exhaust system according to any one of the first to eighth aspects, wherein at least when the temperature sensor unit measures the temperature of the rotating portion, around the temperature sensor unit, the purge gas supplied to the vacuum pump satisfies one of conditions: an amount of the purge gas flowing at a higher velocity than a backflow velocity of gas exhausted by the vacuum pump, and an amount of the purge gas having a pressure of one of an intermediate flow and a viscous flow.

According to the present invention, the temperature of the rotating portion (rotor blade) can be accurately measured by regulating purge gas during temperature measurement.

Moreover, the entry of gas exhausted by the vacuum pump can be prevented around the temperature sensor, precluding corrosion of the temperature sensor and a measurement error caused by deposition of a reaction product.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

DESCRIPTION OF THE PREFERRED EMBODIMENTS

In the present embodiment, a vacuum pump exhaust system has a purge gas supply unit in which a vacuum pump can regulate a flow rate of purge gas as will be discussed in (1) and (2).

(1) At least during a temperature measurement of a rotating portion, an amount of purge gas is supplied at a higher flow velocity than a backflow of gas.

(2) At least during a temperature measurement of the rotating portion, an amount of purge gas is supplied with a gas pressure of an intermediate flow (intermediate flow region) or a viscous flow (viscous flow region) around the temperature sensor unit.

The vacuum pump exhaust system of the present embodiment includes the purge gas supply unit capable of controlling a flow rate of purge gas, as a purge gas flow rate control means for introducing purge gas into the vacuum pump.

With this configuration, the present embodiment can prevent process gas from flowing backward so as to change the composition around the temperature sensor unit, thereby accurately measuring the temperature of the rotating portion.

Referring to FIGS. 1 to 6, a preferred embodiment of the present invention will be described in detail.

Configuration of Exhaust System 1000

Figure 1:
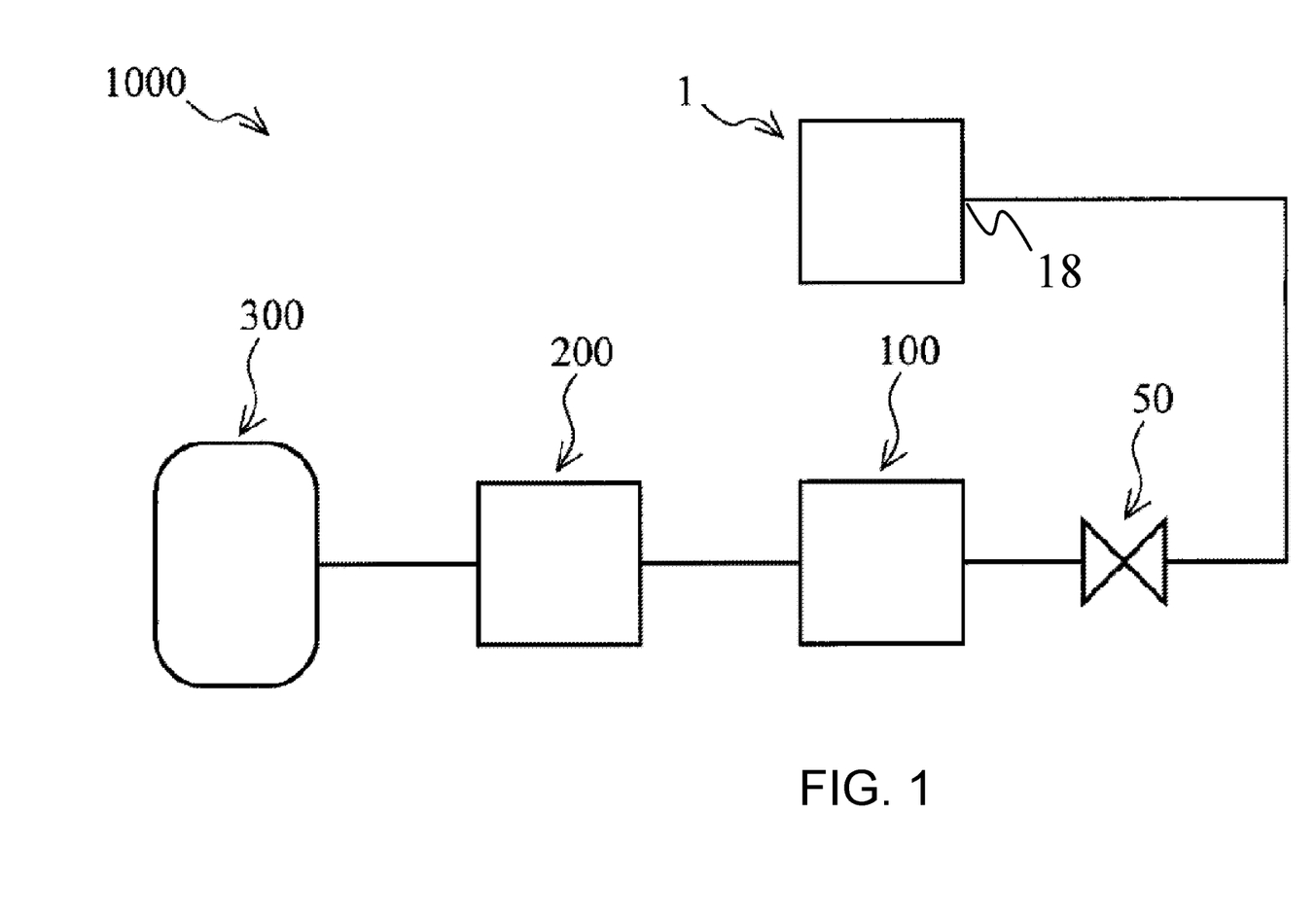
FIG. 1 is an explanatory drawing of a vacuum pump exhaust system according to embodiments of the present invention.

FIG. 1 is an explanatory drawing of a vacuum pump exhaust system 1000 according to an embodiment of the present invention.

The vacuum pump exhaust system 1000 includes a vacuum pump 1, a purge gas supply unit 100, a regulator 200, and a gas cylinder 300.

The configuration of the vacuum pump 1 will be described later.

The purge gas supply unit 100 is a flow-controller that controls a flow rate so as to supply a proper amount of purge gas to the vacuum pump 1. The purge gas supply unit 100 is connected to the purge port (a purge port 18, will be described later) of the vacuum pump 1 via a valve 50.

In this case, purge gas is inert gas such as nitrogen gas ($N_2$) and argon gas (Ar). The purge gas is supplied into an electrical component storage, so that the purge gas is used to protect the electrical component from corrosive gas (used as process gas) that may be contained in exhaust gas from a vacuum container connected to the vacuum pump 1.

In the following embodiment, inexpensive nitrogen gas having relatively high thermal conductivity is used as an example of purge gas.

The regulator 200 is a device for reducing a pressure of gas supplied from the gas cylinder 300 to a usable gas pressure.

The gas cylinder 300 is a storage of nitrogen gas that is the purge gas of the present embodiment.

Configuration of Vacuum Pump 1

The configuration of the vacuum pump 1 disposed in the exhaust system 1000 will be described below.

Figure 2:
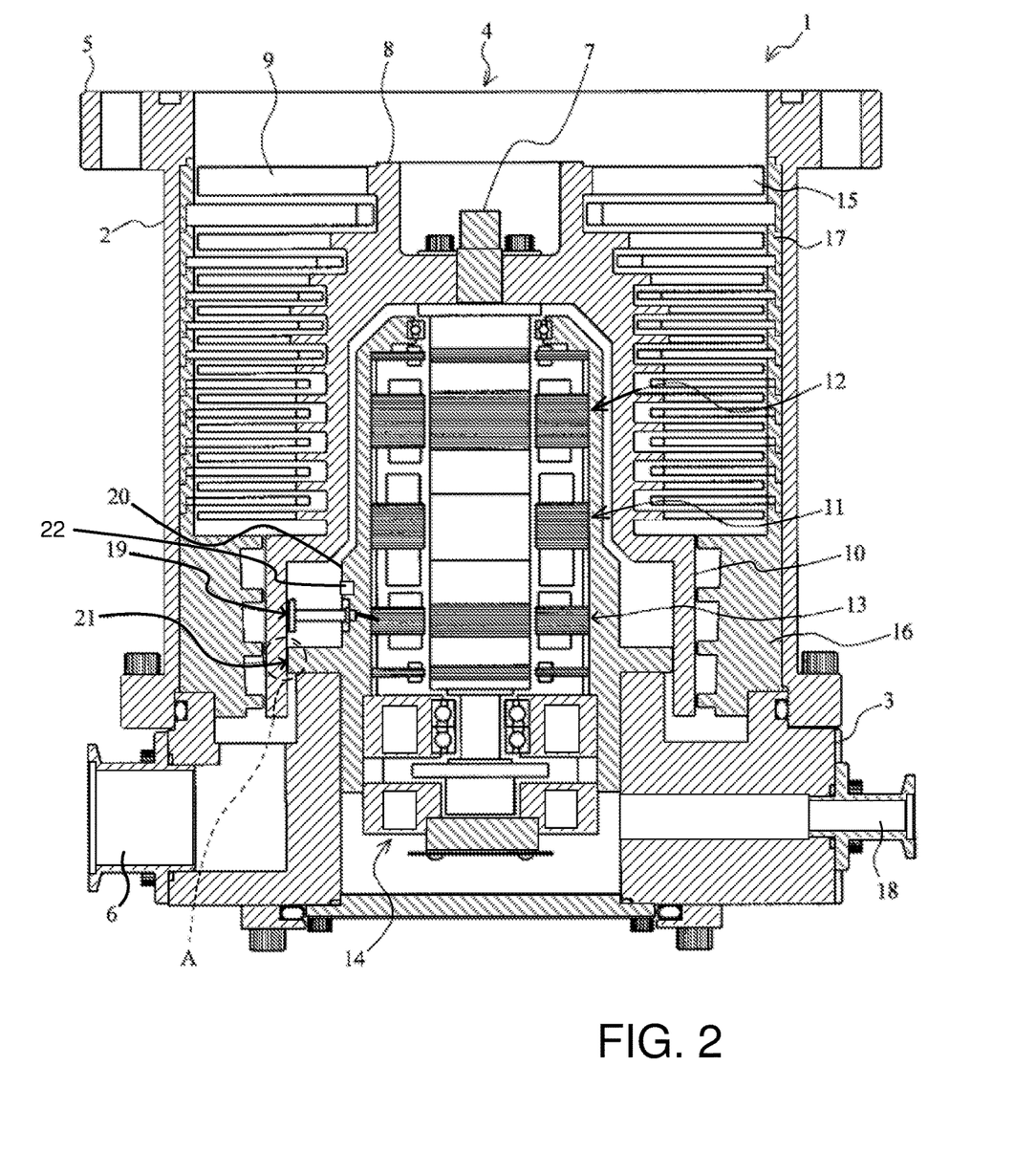
FIG. 2 illustrates a schematic configuration example of a vacuum pump according to Embodiment 1 of the present invention.

FIG. 2 is an explanatory drawing of the vacuum pump 1 according to the embodiment of the present invention. FIG. 2 illustrates an axial sectional view of the vacuum pump 1.

The vacuum pump 1 of the present embodiment is a so-called composite molecular pump including a turbo molecular pump portion and a thread groove pump portion.

A casing 2 forming a housing of the vacuum pump 1 is substantially cylindrical and constitutes the housing of the vacuum pump 1 with a base 3 provided under the casing 2 (near an outlet port 6). In the housing of the vacuum pump 1, a gas transfer mechanism is stored as a structure in which the vacuum pump 1 can perform an exhaust function.

The gas transfer mechanism mainly includes a rotating portion that is rotatably supported and a stator portion that is fixed to the housing of the vacuum pump 1.

On one end of the casing 2, an inlet port 4 for introducing gas into the vacuum pump 1 is formed. Furthermore, on the end of the casing 2, a flange portion 5 extending outward is formed around the inlet port 4.

The base 3 has an outlet port 6 for exhausting gas in the vacuum pump 1.

The rotating portion includes a shaft 7 serving as a rotating shaft, a rotor 8 disposed on the shaft 7, a plurality of rotor blades 9 provided on the rotor 8 (near the inlet port 4), and a rotating cylinder 10 (near the outlet port 6). The shaft 7 and the rotor 8 constitute a rotor portion.

The rotor blades 9 include a plurality of blades that radially extend from the shaft 7 while tilting at a predetermined angle from a plane perpendicular to the axis of the shaft 7.

The rotating cylinder 10 includes a cylindrical member that is disposed downstream of the rotor blades 9 and coaxially with the rotation axis of the rotor 8. In the present embodiment, the downstream side of the rotating cylinder 10 is a target of temperature measurement by the temperature sensor unit 19, which will be described later.

In the middle of the shaft 7, a motor 11 for rotating the shaft 7 at high speed is provided in the axial direction.

Furthermore, the motor 11 of the shaft 7 has radial magnetic-bearing devices 12 and 13 for radially (in a radial direction) supporting the shaft 7 in a noncontact manner near the inlet port 4 and the outlet port 6. At the lower end of the shaft 7, an axial magnetic-bearing device 14 for axially (in the axial direction) supporting the shaft 7 in a noncontact manner is provided. The magnetic bearing devices are enclosed in a stator column 20.

The stator column 20 according to Embodiment 1 of the present invention has a projecting outer portion 21 in a part indicated by a dotted line A in FIG. 2. The projecting outer portion 21 constitutes a constricted portion serving as a purge gas regulating mechanism. The constricted portion will be described later.

On the periphery of the stator column 20, a temperature sensor unit 19 for measuring a temperature of the rotating portion is disposed near the outlet port 6.

The temperature sensor unit 19 includes a disc-shaped heat receiving portion (that is, a temperature sensor portion), a mounting portion fixed to the stator column 20, and a cylindrical insulating portion connecting the heat receiving portion and the mounting portion. The heat receiving portion preferably has a cross-sectional area as large as possible in order to detect heat transmitted from the rotating cylinder 10 (rotating portion) to be measured. The heat receiving portion is opposed to the rotating cylinder 10 with a clearance formed between the heat receiving portion and the rotating cylinder 10.

In the present embodiment, the heat receiving portion is made of aluminum and the insulating portion is made of resin. The heat receiving portion and the insulating portion may be made of other materials and formed into a single resin part.

Moreover, a second temperature sensor 22 may be disposed on the insulating portion, the mounting portion, or the stator column 20 and the temperature of a target (rotating portion) of measurement may be estimated using a temperature difference between the second temperature sensor and the temperature sensor portion (first temperature sensor portion) disposed on the heat receiving portion.

Inside the housing (casing 2) of the vacuum pump 1, a stator portion (stator cylindrical portion) is formed. The stator portion includes stator blades 15 provided near the inlet port 4 (turbo molecular pump portion) and a thread groove spacer 16 (thread groove pump portion) provided on the inner surface of the casing 2.

The stator blades 15 include blades that extend from the inner surface of the housing of the vacuum pump 1 to the shaft 7 while tilting at a predetermined angle from a plane perpendicular to the axis of the shaft 7.

The stator blades 15 in stages are separated from each other by cylindrical spacers 17. In the vacuum pump 1, the stator blades 15 and the rotor blades 9 are alternately formed in stages in the axial direction.

The thread groove spacer 16 has a spiral groove on a surface opposed to the rotating cylinder 10. The thread groove spacer 16 is configured to face the outer surface of the rotating cylinder 10 with a predetermined clearance (gap) formed between the thread groove spacer 16 and the rotating cylinder 10. The direction of the spiral groove formed on the thread groove spacer 16 is a direction of gas transferred to the outlet port 6 in the direction of rotation of the rotor 8 in the spiral groove. The spiral groove may be provided at least one of the opposed surfaces of the rotating portion and the stator portion.

Moreover, the spiral groove decreases in depth toward the outlet port 6. Accordingly, gas transferred in the spiral groove is gradually compressed toward the outlet port 6.

Furthermore, a purge port 18 is provided on the outer surface of the base 3. The purge port 18 communicates with an internal region of the base 3 (i.e., an electrical component storage) through a purge gas channel. The purge gas channel is a horizontal through hole that is radially formed from the outer wall surface to the inner wall surface of the base 3 and acts as a supply channel of purge gas transferred from the purge port 18 into the electrical component storage.

As shown in FIG. 1, the purge port 18 is connected to the gas supply unit 100 via the valve 50.

A flow of purge gas will be described below. Purge gas supplied from the purge port 18 is introduced into the base 3 and the stator column 20. Thereafter, the purge gas passes through the motor 11 and the radial magnetic-bearing devices 12 and 13 and between the rotor 8 and the stator column 20, and moves to the top of the shaft 7. The purge gas is then transferred between the inner surfaces of the stator column 20 and the rotor 8 to the outlet port 6 and is exhausted with drawn gas (used as process gas) out of the vacuum pump 1 from the outlet port 6.

The vacuum pump 1 configured thus performs vacuum exhaust in a vacuum chamber (vacuum vessel, not shown) provided for the vacuum pump 1. The vacuum chamber is, for example, a vacuum device used as a chamber of a surface analyzer or a micromachining device.

The purge gas regulating mechanism provided for the vacuum pump 1 configured thus will be described below.

The purge gas regulating mechanism provided for the vacuum pump 1 includes two configurations for regulating a flow velocity of purge gas (Embodiments 1 and 2) and a configuration for regulating a pressure of purge gas (Embodiment 3).

Embodiment 1—Flow Velocity

FIG. 2 is an explanatory drawing of the constricted portion according to Embodiment 1.

In the vacuum pump 1 according to Embodiment 1, as indicated by the dotted line A in FIG. 2, the stator column 20 has the projecting outer portion 21 (constricted portion) acting as a purge gas regulating mechanism capable of regulating a flow rate of purge gas.

The projecting outer portion 21 in the stator column 20 is formed by increasing the outside diameter of the stator column 20 on at least a part of the downstream side (near the outlet port 6) where the temperature sensor unit 19 is disposed.

The outside diameter of the stator column 20 is partially extended to form the projecting outer portion 21, thereby narrowing the purge gas channel formed by the projecting outer portion 21 and the rotating cylinder 10 that are opposed to each other. The purge gas channel is a clearance formed by the inner surface of the rotating cylinder 10 and the outer surface of the projecting outer portion 21.

If the cross-sectional area of the purge gas channel is reduced while a volume of flowing purge gas is kept constant, the flow velocity of purge gas increases accordingly. Purge gas flows at a higher velocity than reversely diffused exhaust gas (process gas), thereby preventing exhaust gas from reversely flowing (reversely diffusing) around the temperature sensor unit 19.

The projecting outer portion 21 (constricted portion) is desirably formed only on a part of the stator column 20. More specifically, the purge gas channel of the projecting outer portion 21 is desirably up to about 30 mm long in the axial direction.

Moreover, the purge gas channel desirably has a minimum width at the part of the constricted portion (A in FIG. 2) as long as the rotating cylinder 10 (rotating portion) and the stator column 20 (stator portion) are not in contact with each other during an operation of the vacuum pump 1. The purge gas channel is desirably 0.5 mm or less in width.

This configuration increases a viscous drag between the rotating cylinder 10 and the stator column 20, thereby preventing an increase in power consumption and heat generation.

Purge gas presses back exhaust gas downstream of the temperature sensor unit 19. This configuration can prevent process gas exhausted by the vacuum pump 1 from flowing backward around the temperature sensor unit 19 and changing gas components around the temperature sensor unit 19, thereby precluding the possibility of an increase in the number of measurement errors.

Embodiment 2—Flow Velocity

Figure 3:
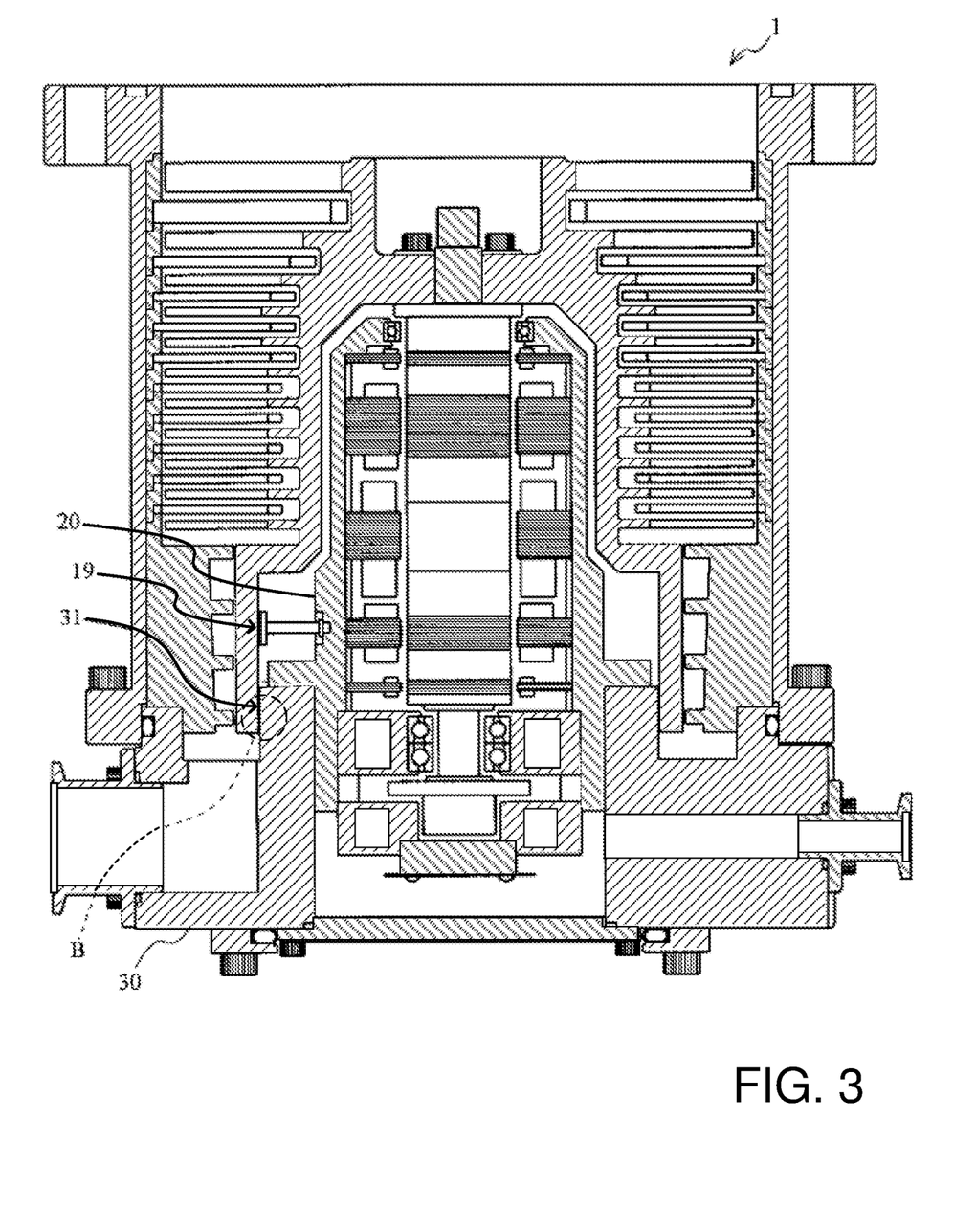
FIG. 3 illustrates a schematic configuration example of a vacuum pump according to Embodiment 2 of the present invention.

Referring to FIG. 3, another embodiment of the constricted portion described in Embodiment 1 will be described below.

FIG. 3 is an explanatory drawing of the constricted portion according to Embodiment 2.

In a vacuum pump 1 according to Embodiment 2, as indicated by a dotted line B in FIG. 3, a base 30 has a large outer portion 31 (constricted portion) acting as a purge gas supply mechanism capable of regulating a flow rate of purge gas.

The large outer portion 31 is formed by increasing the outside diameter of the base 30 on at least a part of the downstream side (outlet port 6) of the position of a temperature sensor unit 19 disposed at a stator column 20 on the base 30.

The outside diameter of the base 30 is partially extended to form the large outer portion 31, thereby narrowing a purge gas channel formed by the large outer portion 31 and a rotating cylinder 10 that are opposed to each other. If a cross-sectional area of the purge gas channel is reduced while a volume of flowing purge gas is kept constant, a flow velocity of purge gas increases as in Embodiment 1. Purge gas flows at a higher velocity than reversely diffused exhaust gas, thereby preventing exhaust gas from reversely flowing around the temperature sensor unit 19.

The large outer portion 31 (constricted portion) is desirably formed only on a part of the base 30. More specifically, the purge gas channel of the large outer portion 31 is desirably up to about 30 mm long in an axial direction.

Moreover, the purge gas channel desirably has a minimum width at the part of the constricted portion (B in FIG. 3) as long as the rotating cylinder 10 (rotating portion) and the base 30 (stator portion) are not in contact with each other during an operation of the vacuum pump 1. The purge gas channel is desirably 0.5 mm or less in width.

This configuration increases a viscous drag between the rotating cylinder 10 and the base 30, thereby preventing an increase in power consumption and heat generation.

Purge gas presses back exhaust gas downstream of the temperature sensor unit 19. This configuration can prevent process gas exhausted by the vacuum pump 1 from flowing backward around the temperature sensor unit 19 and changing gas components around the temperature sensor unit 19, thereby precluding the possibility of an increase in the number of measurement errors.

As described in Embodiments 1 and 2, the constricted portion (purge gas supply mechanism) is disposed downstream of the position of the temperature sensor unit 19 on the purge gas channel, thereby reducing (constricting) the cross-sectional area of the purge gas channel.

Thus, even if only a small amount of purge gas is supplied (evaporation), the small amount of purge gas can flow at a velocity necessary for preventing a backflow of exhaust gas around the temperature sensor unit 19.

Embodiment 3—Pressure

A purge gas regulating mechanism for regulating a pressure of purge gas according to Embodiment 3 will be described below.

Generally, a gas pressure of a molecular flow around the temperature sensor unit 19 may reduce transfer of temperature proportionately to a pressure, disabling the temperature sensor unit 19.

Thus, at least in temperature measurement of a rotating cylinder 10, the purge gas regulating mechanism according to Embodiment 3 supplies a required amount of purge gas such that a gas pressure around the temperature sensor unit 19 reaches a pressure region close to a viscous flow (viscous flow region) instead of a molecular flow.

More specifically, an amount of purge gas is supplied such that a mean free path ($\lambda$) of purge gas is smaller than a clearance between the temperature sensor unit 19 and the rotating cylinder 10.

The mean free path is a mean value of distances of travel of purge gas molecules that move straight ahead after colliding with other molecules.

In this way, a pressure around the temperature sensor unit 19 is raised and heat transfer through gas is accelerated. This configuration can increase a pressure in the vacuum pump 1 and accelerate heat transfer, thereby preventing an increase in the number of measurement errors.

Embodiment 4

Figure 4:
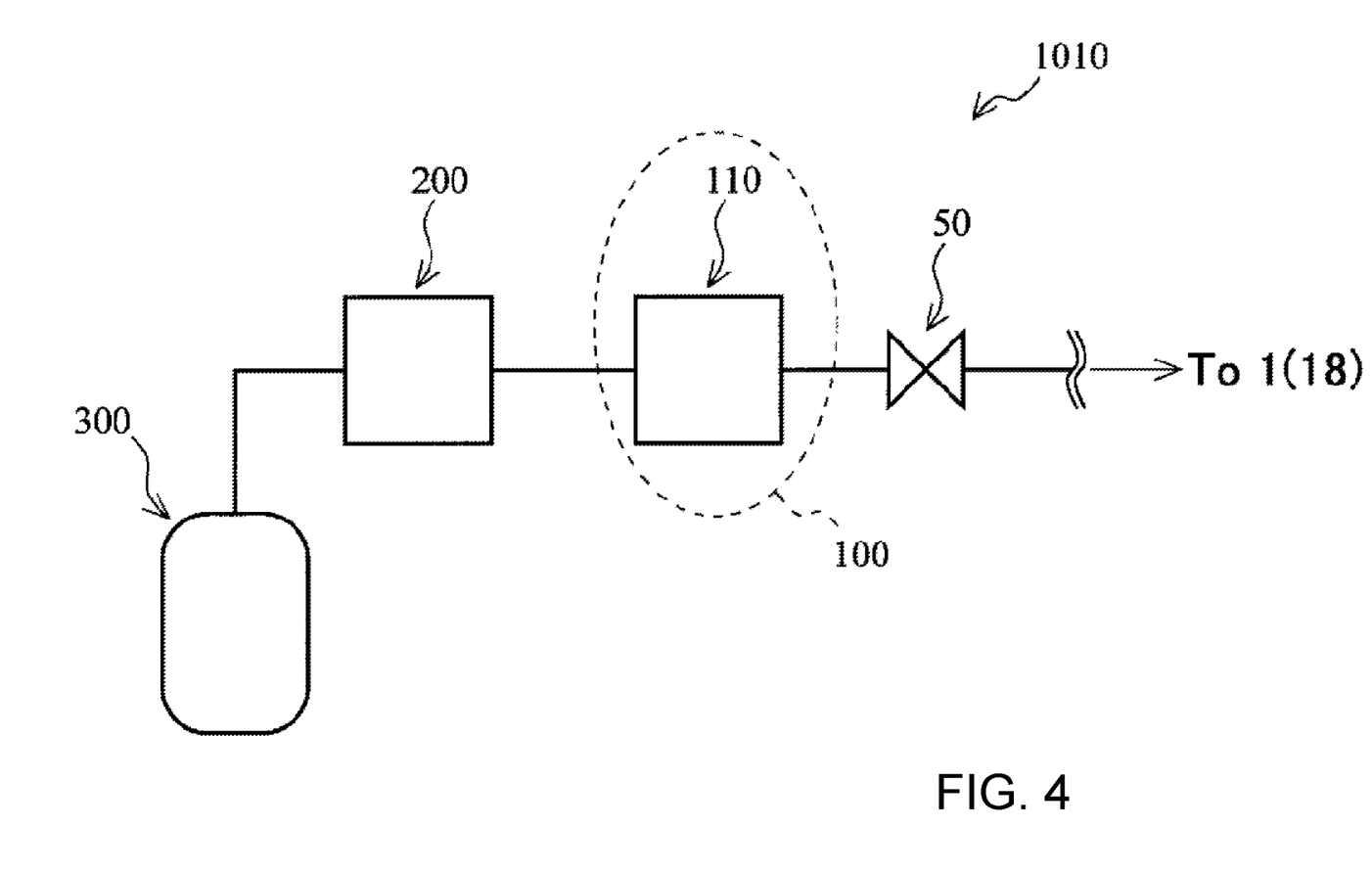
FIG. 4 is an explanatory drawing of a purge gas supply unit disposed in a vacuum pump exhaust system according to Embodiment 4 of the present invention.

Referring to FIG. 4, another embodiment of the exhaust system 1000 according to the present invention will be specifically described below.

FIG. 4 is an explanatory drawing of a purge gas supply unit 100 disposed in a vacuum pump exhaust system 1010 according to Embodiment 4.

In order to implement the Embodiments 1, 2, and 3, at least a certain amount of purge gas is continuously supplied, which may increase the cost and a heating value.

Thus, in order to reduce a flow rate of purge gas when a temperature is not measured by a temperature sensor unit 19, a mass-flow controller 110 is provided as a means of controlling a flow rate of purge gas in Embodiment 4. The control means can set at least two conditions of a flow rate when purge gas is introduced into a vacuum pump 1.

In the exhaust system 1010 provided with the mass-flow controller 110, a flow rate of purge gas can be temporarily increased during temperature measurement.

As described above, in Embodiment 4, the mass-flow controller 110 acts as a flow-controller for regulating a flow rate of purge gas. This can prevent a continuous flow of at least a certain amount of purge gas from increasing the cost or the heating value.

Embodiment 5

Figure 5:
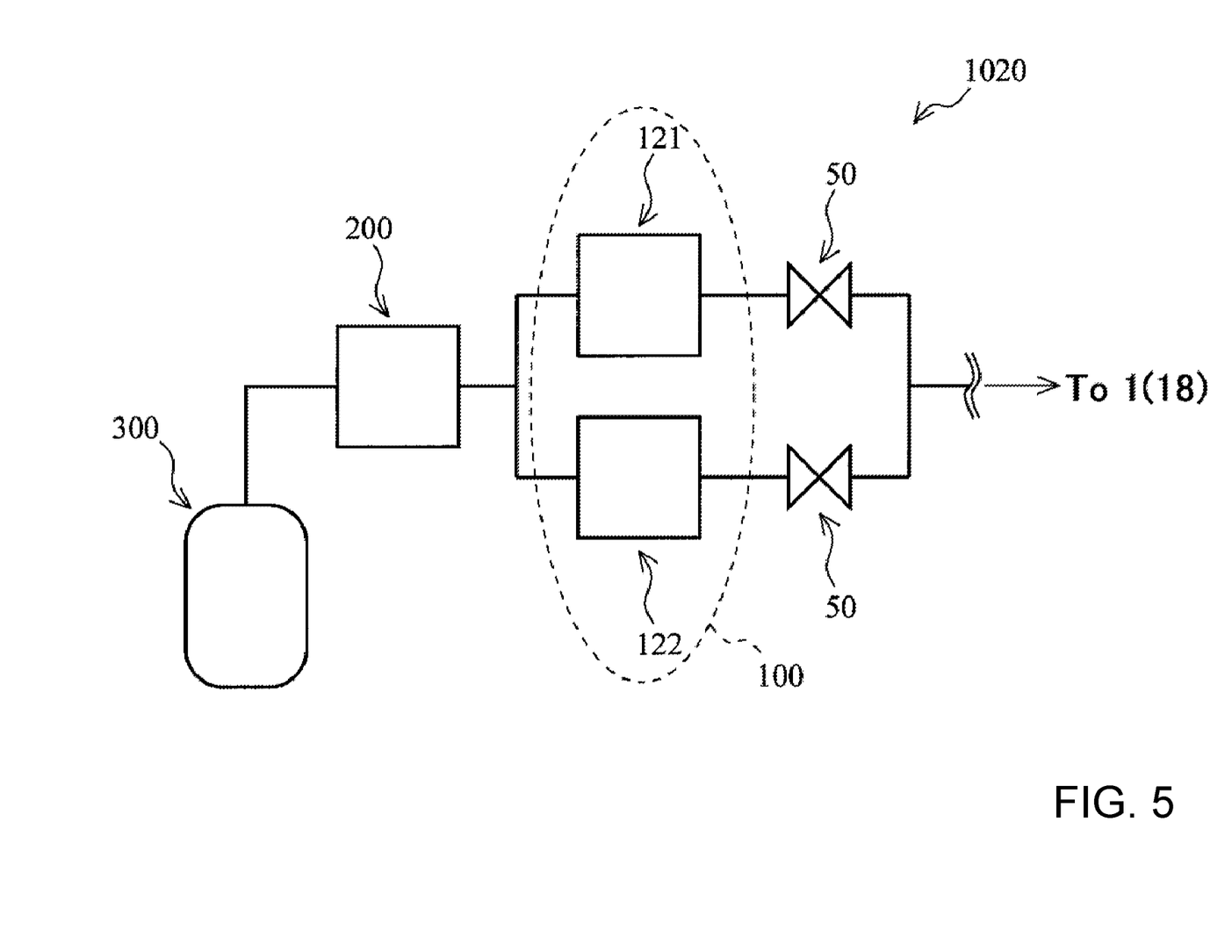
FIG. 5 is an explanatory drawing of a purge gas supply unit disposed in a vacuum pump exhaust system according to Embodiment 5 of the present invention.

Referring to FIG. 5, another embodiment of the exhaust system 1000 according to the present invention will be specifically described below.

FIG. 5 is an explanatory drawing of a purge gas supply unit 100 disposed in a vacuum pump exhaust system 1020 according to Embodiment 5.

As shown in FIG. 5, the purge gas supply unit 100 in Embodiment 5 includes two flow restrictors 121 and 122.

Specifically, in order to reduce a flow rate of purge gas when a temperature is not measured by a temperature sensor unit 19, the flow restrictors (121 and 122) are provided as purge gas flow-rate control means that can change a flow rate when purge gas is introduced into the vacuum pump 1.

The exhaust system 1020 including the flow restrictors (121 and 122) can temporarily increase a flow rate of purge gas during temperature measurement.

In this way, in Embodiment 5, the flow restrictors (121 and 122) act as flow-controllers for regulating a flow rate of purge gas.

The flow restrictors (121 and 122) are flow-controllers in which a difference in atmospheric pressure is used. When a flow rate of purge gas is to be increased, two valves 50 are opened to supply purge gas in parallel.

As described above, the flow restrictors (121 and 122) act as flow-controllers for regulating a flow rate of purge gas in Embodiment 5. This can prevent a continuous flow of at least a certain amount of purge gas from increasing the cost or the heating value.

Figure 6:
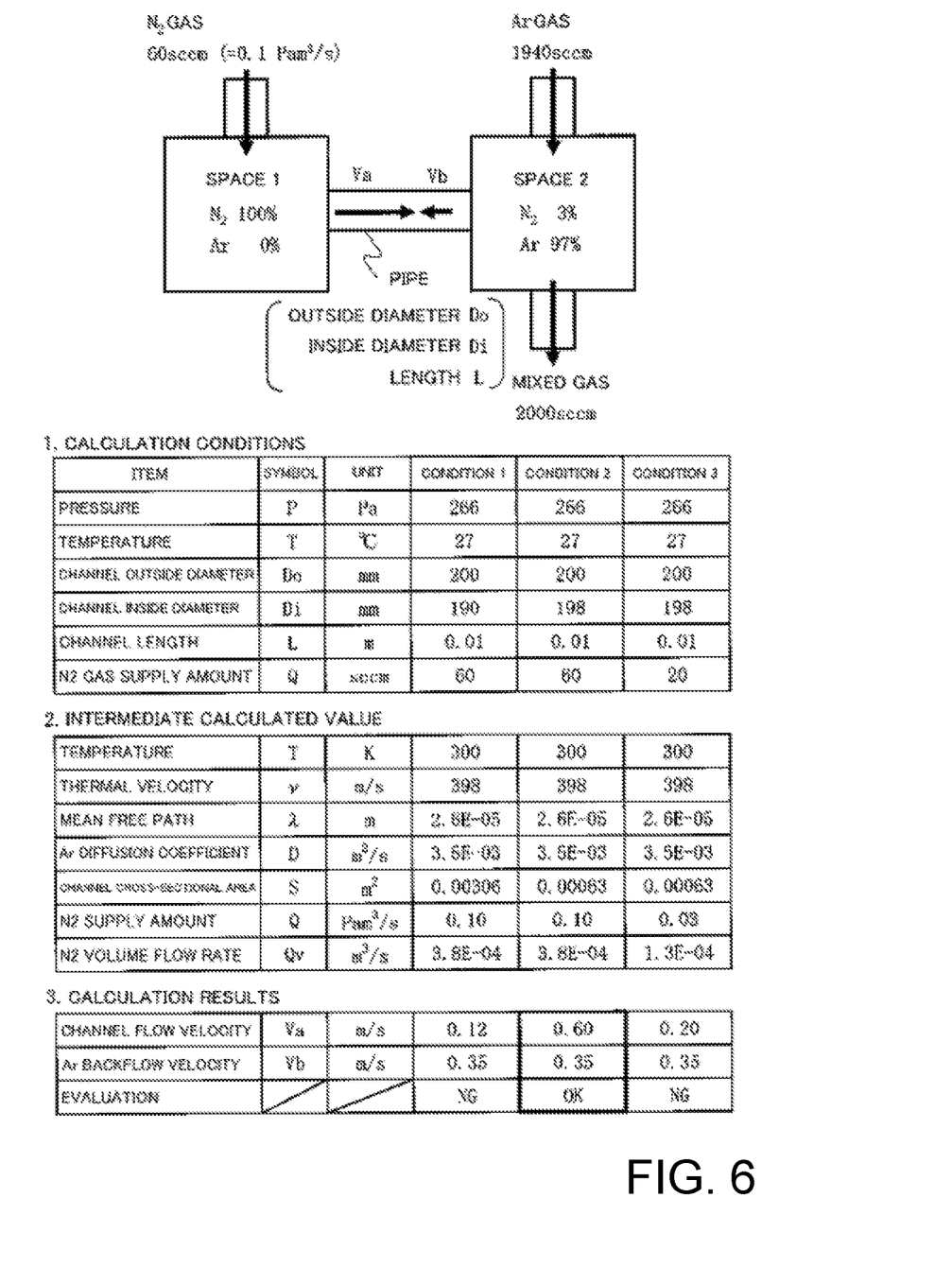
FIG. 6 is an explanatory drawing showing a backflow velocity according to Embodiments 1 and 2 of the present invention.

FIG. 6 is an explanatory drawing showing a velocity of backflow of gas according to Embodiments 1 and 2 of the present invention.

As for conditions for preventing backflow in theory (a flow rate of gas passing through a purge gas channel, the flow rate being set to prevent backflow of exhaust gas), a flow of calculation will be discussed using the models of a space 1 and a space 2 in FIG. 6.

FIG. 6 illustrates the space 1 where $N_2$ gas is introduced, the space 2 where Ar gas is introduced, and a pipe connecting the space 1 and the space 2.

The space 1 corresponds to a purge gas channel having the temperature sensor unit 19, the pipe corresponds to a purge gas channel, and the space 2 corresponds to an exhaust gas channel near the outlet port 6.

The pipe has an outside diameter of Do, an inside diameter of Di, and a length of L.

As shown in FIG. 6, $N_2$ gas of 60 sccm (0.1 Pam$^3$/s) is introduced into the space 1. At this point, in the ratio of components in the space 1, Ar gas accounts for 0% while $N_2$ gas accounts for 100%. Moreover, $N_2$ gas flows from the space 1 to the space 2 through the pipe at a flow velocity of Va.

Ar gas of 1940 sccm is introduced into the space 2. Ar gas flows from the space 2 to the space 1 through the pipe at a flow velocity of Vb. At this point, in the ratio of components in the space 2, Ar gas accounts for 97% while $N_2$ gas accounts for 3%.

As described above, there is a difference in the concentration of Ar gas between the space 1 and space 2.

An amount of Ar gas flowing backward in the pipe due to the concentration difference (a diffusion velocity in a steady state) can be theoretically determined by calculation of Fick's first law of diffusion (Expression 1) below.

$$J = D \times (C2 - C1)/L \quad \text{[Expression 1]}$$

where J is a flux (mol/m²s), D is a diffusion coefficient (m²s), C1 is an Ar gas concentration (mol/m³) of the space 1, C2 is an Ar gas concentration (mol/m³) of the space 2, and L is a distance (m).

As shown in FIG. 6, Ar gas accounts for 0% in the space 1 and thus C1 is 0, so that a flow rate (backflow velocity) Vb of Ar gas moving from the space 2 to the space 1 can be calculated by Expression 2 below.

$$Vb = -J/C2 = \{D \times (C2-C1)/L\}/C2 = D/L \quad \text{[Expression 2]}$$

In other words, Vb is a numeric value obtained by dividing the diffusion coefficient D by the distance L.

The diffusion coefficient D can be calculated using a mean thermal velocity v of gas molecules and a mean free path λ according to Expression 3 below.

$$D = \tfrac{1}{3} \times v \times \lambda \quad \text{[Expression 3]}$$

Hence, for example, at a pressure of 266 Pa and a distance L of 0.01 m, the flow velocity (backflow velocity) Vb of Ar gas can be determined as Vb=0.35 m/s by calculation of Expression 4 below (see calculation conditions in FIG. 6).

$$Vb = D/L = (\tfrac{1}{3} \times 398 \times 2.6 \times 10^{-5})/0.01 = 0.35 \text{ (m/s)} \quad \text{[Expression 4]}$$

It is understood that Vb is 0.35 m/s and thus a backflow of Ar gas from the space 2 to the space 1 can be prevented if the flow velocity Va is higher than Vb.

A channel width for setting the flow velocity Va higher than Vb will be described below, in order to prevent a backflow of Ar gas from the space 2 to the space 1.

When 60 sccm (converted to 0.1 Pam³/s) of $N_2$ gas is supplied, a volume flow rate Qv (m³/s) can be calculated by Expression 5 below.

$$Qv = 0.1/266 = 3.8 \times 1.0^{-4} \text{ (m}^3\text{/s)} \quad \text{[Expression 5]}$$

Thus, as will be discussed in the following example, it is understood that "$N_2$ gas flow velocity: Va>Ar gas backflow velocity: Vb" is established by reducing the width of the channel (cross-sectional area), thereby preventing a backflow of Ar molecules from the space 2 to the space 1.

"Reducing the width of the channel (pipe)" is synonymous with "providing the constricted portion at the purge gas channel" in Embodiments 1 and 2.

(Example) If the channel has an outside diameter of 200 mm and a width of 1 mm (i.e., an inside diameter of 198 mm), the channel has a cross-sectional area of $\pi/4 \times (0.2^2 - 0.198^2) =$ (100063 m² and the velocity Va of $N_2$ gas passing through the channel is $3.8 \times 10^{-4}/0.00063 = 0.60$ (m/s).

In other words, in this case, Vb=0.35 (m/s) is set for Va=0.60 (m/s) and thus Va>Vb ($N_2$ gas flow velocity>Ar gas backflow velocity) is established. This proves that Ar gas does not flow backward from the space 2 to the space 1.

If the outside diameter is 200 mm and the channel width is 5 mm, which is longer than 1 mm by 4 mm (that is, an inside diameter of 190 mm), the channel has a cross-sectional area of $\pi/4 \times (0.2^2 - 0.19^2) = 0.00306$ m² and a velocity (Va) in the channel is a $3.8 \times 10^{-4}/0.00306 = 0.1$ (m/s).

In other words, if the channel width is 5 mm as in the related art, Vb=0.35 (m/s) is obtained for Va=0.12 (m/s) and thus Va<Vb ($N_2$ gas flow velocity<Ar gas backflow velocity) is established. This proves that Ar gas flows backward from the space 2 to the space 1.

As described above, the vacuum pump exhaust systems (1000, 1010, and 1020) according to the embodiments of the present invention can prevent gas components other than gas components supplied as purge gas from flowing backward around the temperature sensor unit 19 and changing gas components so as to change a heat transfer amount. Furthermore, a pressure can be increased around the temperature sensor unit 19 and heat transfer can be accelerated.

Additionally, the entry of gas exhausted by the vacuum pump can be prevented around the temperature sensor, precluding corrosion of the temperature sensor or a measurement error caused by deposition of a reaction product.

Moreover, the flow rate of purge gas is increased only during temperature measurement, thereby saving the consumption of purge gas.

This improves the accuracy of temperature measurement of the rotating cylinder 10 by the temperature sensor unit 19. Therefore, the temperature of the rotating cylinder 10 can be accurately measured, thereby preventing malfunctions caused by overheating. Specifically, the rotating cylinder 10 rising in temperature can be prevented from being thermally expanded and damaged in contact with another component, the rotating portion and the stator portion can be prevented from being damaged in contact with each other by creep deformation occurring in a continuous high temperature condition, and the rotating cylinder 10 is prevented from being damaged due to a material strength reduced by overheating.

The embodiments and modifications of the present invention may be combined as needed. The temperature sensor may be an infrared temperature sensor.

The present invention can be modified without departing from the scope of the present invention. The present invention is naturally extended to the modifications.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A vacuum pump exhaust system, comprising:
   a vacuum pump having a temperature sensor unit in a purge gas channel between a stator column and a rotating portion that measures a temperature of the rotating portion;
   a purge gas storage that stores purge gas used in the vacuum pump; and
   a flow controller that supplies the purge gas stored in the purge gas storage to the vacuum pump and is configured to set a flow rate of the purge gas to a first flow rate while the rotating portion is rotating without the temperature sensor unit measuring the temperature of the rotating portion and is configured to set the flow rate of the purge gas to a second flow rate while the rotating portion is rotating with the temperature sensor unit measuring the temperature of the rotating portion, the second flow rate being greater than the first flow rate.

2. The vacuum pump exhaust system according to claim 1, wherein an amount of the purge gas supplied to the vacuum pump in the second flow rate is the amount of purge gas such that a mean free path of the purge gas around the temperature sensor unit is smaller than a distance between the temperature sensor unit and the rotating portion.

3. The vacuum pump exhaust system according to claim 1, wherein the stator column stores an electrical component to rotate the rotating portion, and the vacuum pump further includes a base with the stator column fixed thereto, the stator column including a constricted portion downstream of the temperature sensor unit in relation to a direction of purge gas flow in the purge gas channel, the constricted portion having a larger outside diameter than the base.

4. The vacuum pump exhaust system according to claim 1, wherein the stator column for storing an electrical component for rotating the rotating portion, and a base with the stator column fixed thereto, the base including a constricted portion downstream of the temperature sensor unit in relation to a direction of purge gas flow in the purge gas channel, the constricted portion having a larger outside diameter than the stator column.

5. The vacuum pump exhaust system according to claim 1, wherein the temperature sensor unit comprises:

a heat receiving portion opposed to the rotating portion;
an insulating portion supporting the heat receiving portion;
a mounting portion for mounting the insulating portion into the vacuum pump; and
a first temperature sensor fixed to the heat receiving portion.

6. The vacuum pump exhaust system according to claim 5, wherein the heat receiving portion and the insulating portion of the temperature sensor unit are molded integrally.

7. The vacuum pump exhaust system according to claim 5, wherein the temperature sensor unit includes a second temperature sensor on one of the insulating portion, the mounting portion, and a component for mounting the temperature sensor unit, and the temperature sensor unit measures the temperature of the rotating portion according to a temperature difference between the first temperature sensor and the second temperature sensor.

8. An exhausting method in a vacuum pump exhaust system, the method comprising:

rotating a rotating portion of the vacuum pump;
while measuring a temperature of the rotating portion using a temperature sensor unit located in a purge gas channel between a stator column and the rotating portion of the vacuum pump, setting a flow rate of purge gas provided to the purge gas channel to a first flow rate; and
while rotating the rotating portion without measuring the temperature of the rotating portion, setting the flow rate of the purge gas provided to the purge gas channel to a second flow rate, the second flow rate being less than the first flow rate.

* * * * *